US008100259B2

(12) United States Patent
Yeh et al.

(10) Patent No.: US 8,100,259 B2
(45) Date of Patent: Jan. 24, 2012

(54) CARRIER APPARATUS FOR FASTENER

(75) Inventors: Chin-Wen Yeh, Taipei Hsien (TW); Zhen-Neng Lin, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 227 days.

(21) Appl. No.: 12/580,318

(22) Filed: Oct. 16, 2009

(65) Prior Publication Data
US 2011/0024468 A1 Feb. 3, 2011

(30) Foreign Application Priority Data
Jul. 29, 2009 (CN) .......................... 2009 1 0304951

(51) Int. Cl.
*B65D 85/24* (2006.01)
(52) U.S. Cl. ...................................... 206/347
(58) Field of Classification Search .................. 206/372, 206/373, 376, 377, 379, 713, 347, 336, 344; 211/70.6
See application file for complete search history.

(56) References Cited

U.S. PATENT DOCUMENTS

| 4,144,735 A * | 3/1979 | Rothenberger | 206/372 |
| 4,718,551 A * | 1/1988 | Whitledge | 206/347 |
| 4,813,551 A * | 3/1989 | Kuo | 211/70.6 |
| 5,096,061 A * | 3/1992 | Wakai | 206/347 |
| 5,775,514 A * | 7/1998 | Lin | 206/347 |
| 6,209,722 B1 * | 4/2001 | Leistner | 206/344 |

* cited by examiner

*Primary Examiner* — J. Gregory Pickett
*Assistant Examiner* — Andrew Perreault
(74) *Attorney, Agent, or Firm* — Altis Law Group, Inc.

(57) ABSTRACT

A carrier apparatus for carrying at least one fastener includes a back plate, at least one inserting hole defined on the base plate, a restricting hole defined on the base plate communicating with the at least one inserting hole, at least two elastic flanges, and a fixing flange adjacent to the restricting hole. The at least one inserting hole is configured for inserting a body of the at least one fastener therein. The restricting hole is configured for receiving the body of the at least one fastener therein. The body of the at least one fastener inserts in the at least one inserting hole and is moved in to the restricting hole. The body presses the at least two elastic flanges when entering the restricting hole. The fixing flange abuts a head portion of at least one fastener to fix the at least one fastener on the base plate.

8 Claims, 4 Drawing Sheets

CARRIER APPARATUS FOR FASTENER

BACKGROUND

1. Technical Field

The present disclosure relates to a carrier apparatus for carrying at least one fastener.

2. Description of Related Art

A back plate of a computer usually has a plurality of spare screws thereon. The spare screws are typically secured on the back plate and engaged with a plurality of screw holes therein. Therefore, an additional tool, such as a screwdriver is needed to mount the spare screws to the back plate, which is very inconvenient and time-consuming in a factory assembly line.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
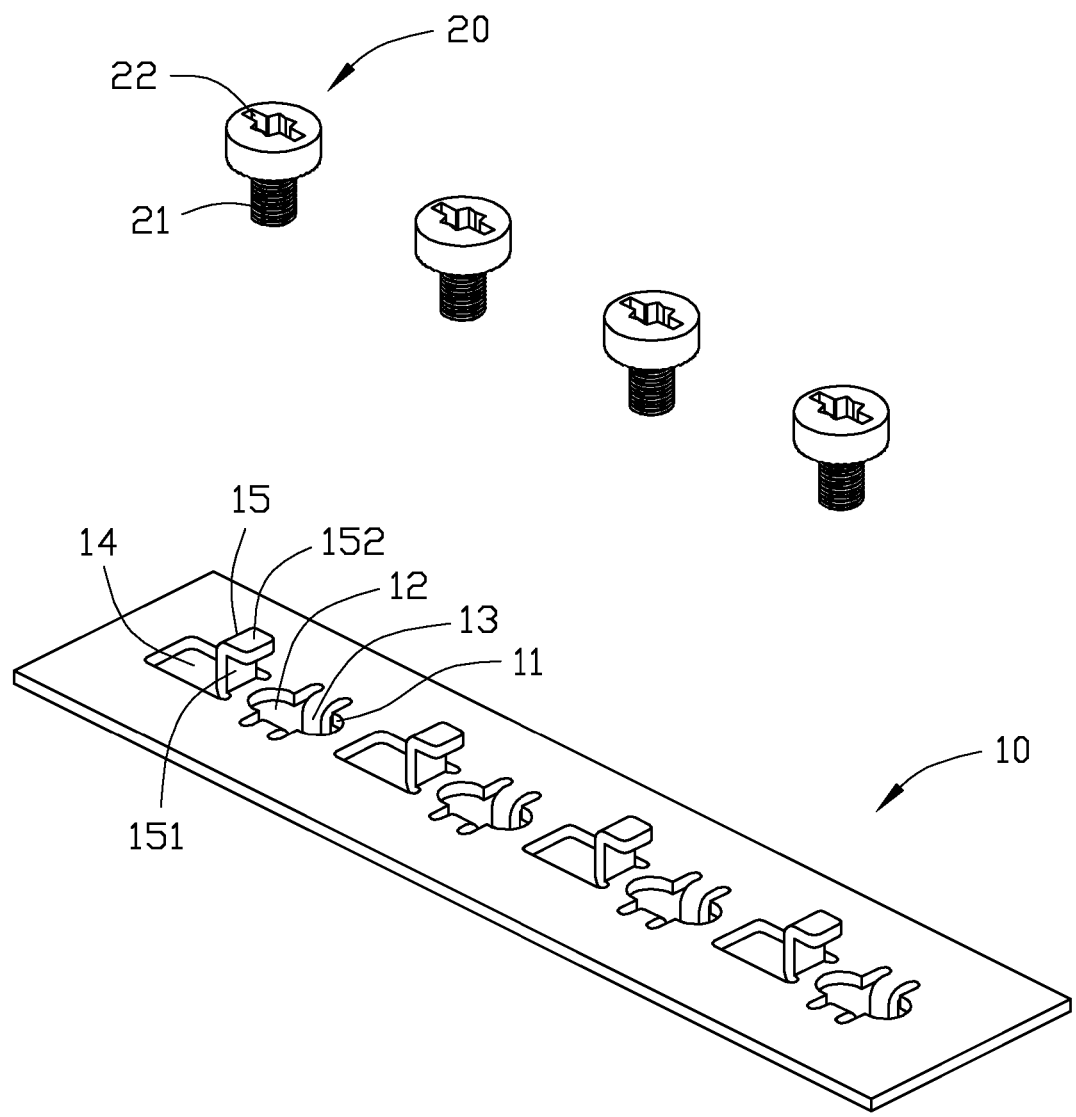
FIG. 1 is an exploded view of an embodiment of a carrier apparatus and at least one fastener.

Referring to FIG. 1, an embodiment of a carrier apparatus for carrying at least one fastener 20 includes a back plate 10, a plurality of large inserting holes 11 defined in the back plate 10, and a plurality of small restricting holes 12 defined in the back plate 10 communicating with the corresponding inserting holes 11. The at least one fastener 20 includes a columnar body 21, and a head portion 22 extending from a top portion of the body 21. Two elastic flanges 13 extend from two connecting portions (not labeled) between the corresponding inserting holes 11 and restricting holes 12 respectively. A rectangular slot 14 is defined in the back plate 10 beside each restricting hole 12. An L-shaped fixing flange 15 adjacent to a corresponding restricting hole 12 extends from a side edge of a corresponding slot 14. An extending direction of the fixing flanges 15 is opposite to that of the elastic flanges 13. Each fixing flange 15 includes an upright connecting portion 151, and a top wall 152 bent from a top edge of the connecting portion 151. A diameter of the inserting hole 11 is greater than that of the body 21 and can be in the range of about 0.2 mm to about 0.8 mm. A diameter of the restricting hole 12 is substantially equal to that of the body 21. A distance between the two elastic flanges 13 is less than the diameter of the body 21 and can be in the range of about 0.1 mm to about 0.5 mm.

Figure 2:
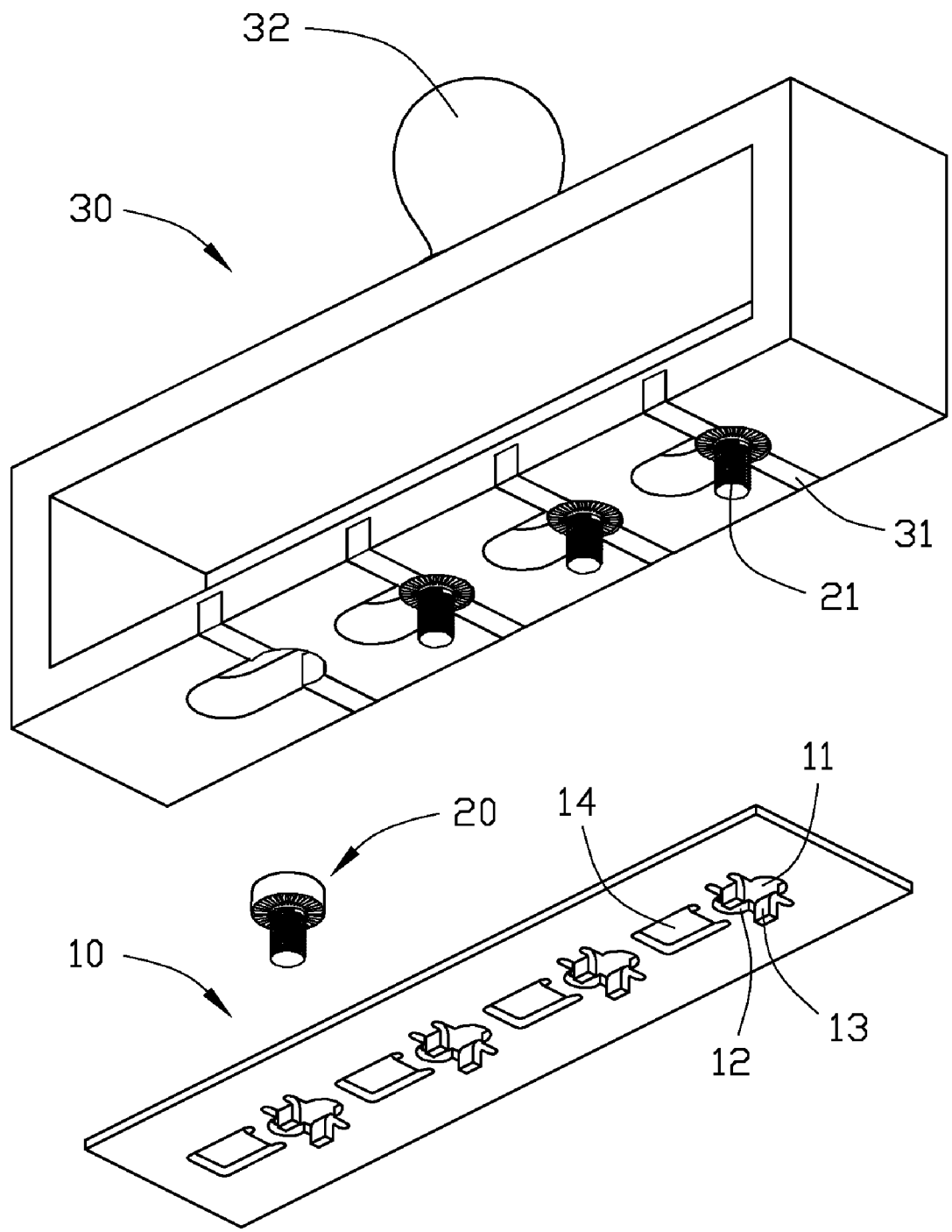
FIG. 2 is an isometric view of an embodiment of using a special tool to fix the at least one fastener to the carrier apparatus.

Referring to FIG. 2, a tool 30 is used to fix the at least one fastener 20 to the back plate 10. In one embodiment, the tool 30 is capable of fixing four fasteners 20 to the back plate 10 at one time. The tool 30 includes a plurality of clamping portions 31 and a handle 32 formed on a top of the tool 30. Each clamping portion 31 has an arcuate inner edge corresponding to the body 21. Two adjacent clamping portions 31 cooperatively form a slot therein for receiving the head portion 22. A dimension of the slot is substantially equal to that of the head portion 22.

Figure 3:
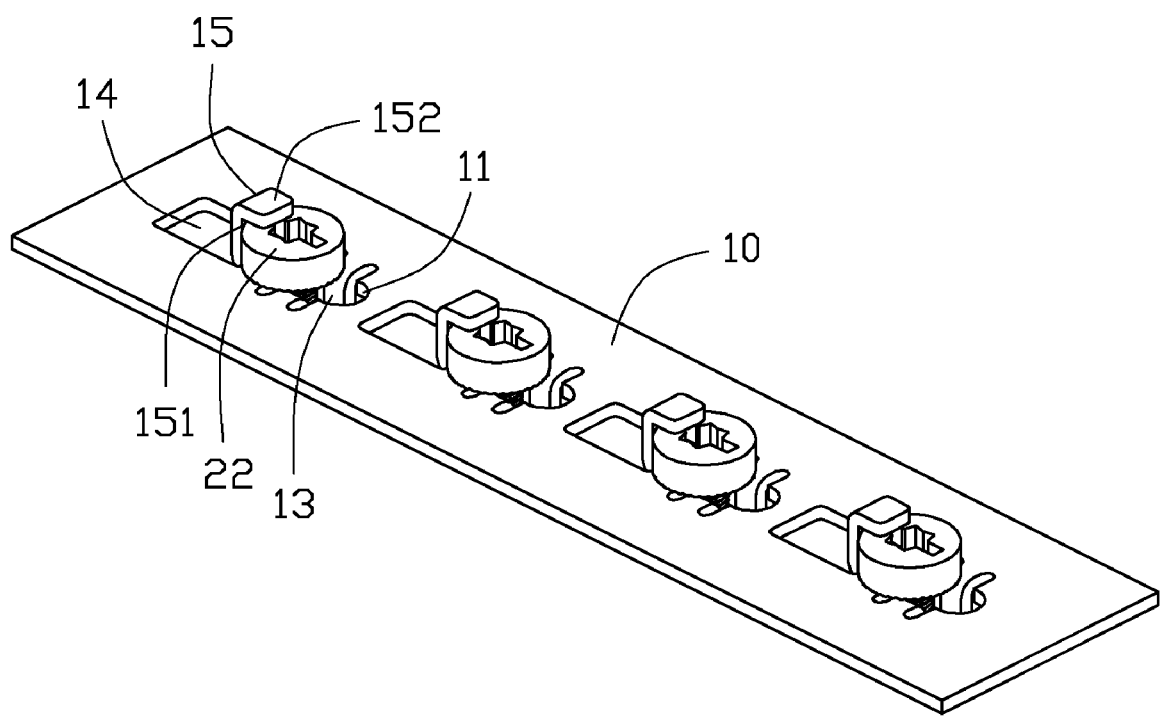
FIG. 3 is an assembled view of the carrier apparatus and the fasteners of FIG. 1.
Figure 4:
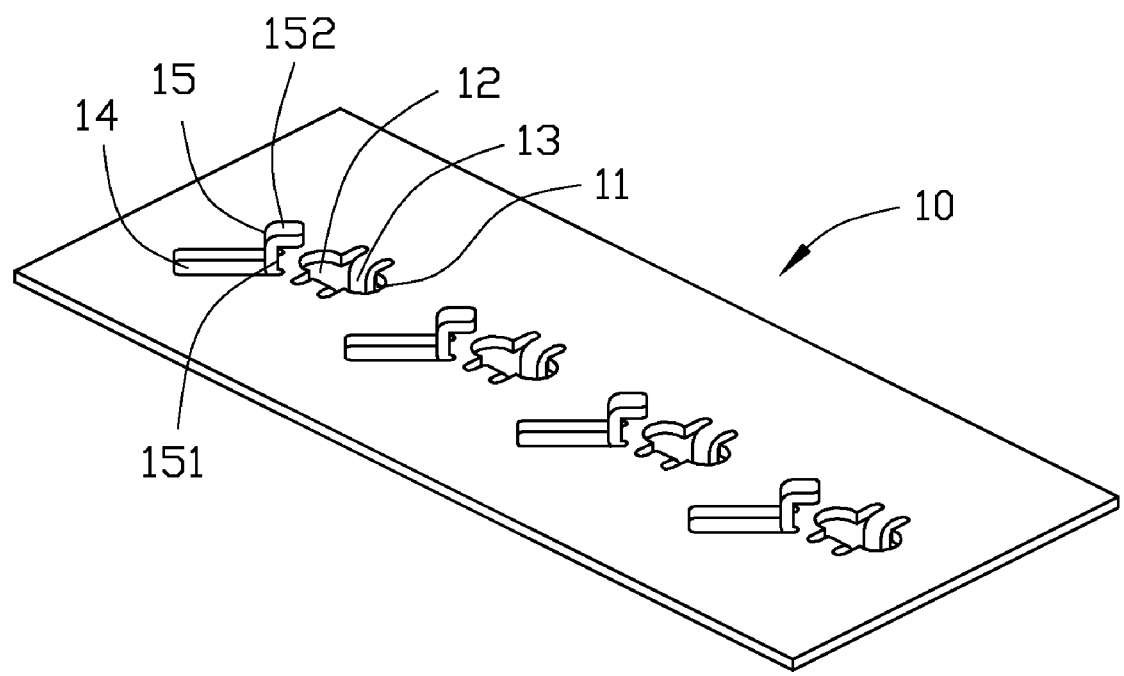
FIG. 4 is an isometric view of another embodiment of the carrier apparatus for carrying at least one fastener.

In use, each fastener 20 is inserted into the two adjacent clamping portions 31. The clamping portions 31 are movably fixed on the tool 30 for engaging with the corresponding head portions 22 of the fasteners 20. When the fasteners 20 of a different size are fixed on the back plate 10, the clamping portions 31 of a corresponding size are fixed on the tool 30 for engaging with the fasteners 20. Therefore, a shape of the slot formed by the two adjacent clamping portions 31 is similar to that of the head portion 22 of the corresponding fastener 20. The tool 30 is moved toward the back plate 10 until each fastener is inserted into the corresponding inserting hole 11. The handle 32 is pushed to move the tool 30 in the horizontal direction relative to the back plate 10. Each body 21 of the corresponding fastener 20 presses the two adjacent elastic flanges 13. The two adjacent elastic flanges 13 are elastically deformed. The tool 30 go on moving in the horizontal direction relative to the back plate 10 until each body 21 of the corresponding fastener 20 releases the two adjacent elastic flanges 13. Each body 21 of the corresponding fastener 20 enters the corresponding restricting hole 12. Referring to FIG. 3, which is an assembled view of the carrier apparatus together with the fasteners 20, when the fasteners 20 are all received in the corresponding restricting holes 12, the tool 30 is pulled to move the tool 30 away from the back plate 10. The head portions 22 abut the corresponding top walls 152 on the fixing flanges 15. The fasteners 20 are fixed on the back plate 10. FIG. 4 is an isometric view of another embodiment of the carrier apparatus. In this embodiment, the fixing flanges 15 are oriented at an angle to the corresponding restricting holes 12 to receive the fasteners 20 of different sizes.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A carrier apparatus assembly, comprising:
    at least one fastener comprising a body, and a head portion extends from a top portion of the body;
    a base plate;
    at least one inserting hole defined by the base plate for the body of the at least one fastener inserted;
    at least one restricting hole defined by the base plate communicating with the at least one inserting hole for receiving the body of the at least one fastener therein;
    at least two elastic flanges extend from two connecting portions between the at least one inserting hole and the at least one restricting hole; and
    a fixing flange adjacent to the restricting hole extends from the base plate in a direction opposite to that of the at least two elastic flanges; wherein the at least one inserting hole is capable of accepting the body of the at least one fastener therein; the at least two elastic flanges are capable of being elastically deformed; the fixing flange is capable of abutting the head portion of the at least one fastener to fix the at least one fastener on the base plate and the body of the at least one fastener is received in the at least one restricting hole.

2. The carrier apparatus assembly of claim 1, wherein the fixing flange is L-shaped, the fixing flange comprises an upright connecting portion, and a top wall bent from a top edge of the connecting portion, the top wall of the fixing flange is capable of abutting the head portion of the at least one fastener when the at least one fastener is received in the restricting hole.

3. The carrier apparatus assembly of claim 2, wherein a rectangular slot is defined on the back plate beside the restricting hole, and the fixing flange extends from a side edge of the slot.

4. The carrier apparatus assembly of claim 3, wherein the fixing flange is oriented at an angle from the restricting hole.

5. The carrier apparatus assembly of claim 1, wherein a diameter of the inserting hole is greater than that of the body of the fastener and can be in the range of about 0.2 mm to about 0.8 mm; a diameter of the restricting hole is substantially equal to that of the body.

6. The carrier apparatus assembly of claim 1, wherein a distance between the at least two elastic flanges is less than the diameter of the body and can be in the range of about 0.1 mm to about 0.5 mm.

7. The carrier apparatus assembly of claim 1, further comprising a tool capable of fixing the at least one fastener to the back plate; the tool comprises a plurality of clamping portions, and a handle formed on a top of the tool; wherein two adjacent pluralities of clamping portions cooperatively form a slot therein for receiving the head portion of the at least one fastener.

8. The carrier apparatus assembly of claim 7, wherein a dimension of the slot is substantially equal to that of the head portion.

* * * * *